United States Patent [19]
Lee

[11] Patent Number: 5,748,605
[45] Date of Patent: May 5, 1998

[54] ROTARY ARM-TYPE OPTICAL PICK-UP DRIVING DEVICE

[75] Inventor: Jong-wan Lee, Suwon, Rep. of Korea

[73] Assignee: Samsung Electronics Co., Ltd., Kyungki-do, Rep. of Korea

[21] Appl. No.: 751,054

[22] Filed: Nov. 15, 1996

[30] Foreign Application Priority Data

Nov. 16, 1995 [KR] Rep. of Korea ............... 95-41650
Dec. 27, 1995 [KR] Rep. of Korea ............... 95-59533

[51] Int. Cl.$^6$ ................................................. G11B 7/08
[52] U.S. Cl. ........................ 369/222; 369/219; 360/106
[58] Field of Search ............................. 369/215, 219, 369/222; 360/104, 106

[56] References Cited

U.S. PATENT DOCUMENTS

| | | | |
|---|---|---|---|
| 4,403,316 | 9/1983 | Van De Veerdonk | 369/222 |
| 4,408,311 | 10/1983 | Suzuki et al. | 369/219 |
| 5,117,413 | 5/1992 | Van Rosmalen et al. | 369/222 |
| 5,615,203 | 3/1997 | Fukakusa | 369/219 |

FOREIGN PATENT DOCUMENTS 63-52383  3/1988  Japan ................... 360/104

*Primary Examiner*—Jefferson Evans
*Attorney, Agent, or Firm*—Sughrue, Mion, Zinn, Macpeak & Seas, PLLC

[57] ABSTRACT

An optical pick-up driving device includes: a base; a rotary arm installed with respect to the base and operative to rotate around a first guide pin; a rotation driving mechanism, arranged along the rotary arm and said base, for rotating the rotary arm; an optical pick-up assembly coupled with the rotary arm and operative to rotate around a second guide pin; and an interlocking mechanism for rotating the optical pick-up assembly and which is interlocked with the rotation of the rotary arm. Another optical pick-up driving device includes: a base; an optical pick-up rotatably supported by the base; a rotation driving unit for rotating the optical pick-up; and a moving unit for guiding the movement of the optical pick-up. The moving unit includes: a first guide pin installed at one portion of the base being spaced by a predetermined distance, from the optical pick-up; a second guide pin installed on the base to be nearer to the optical pick-up than the first guide pin; a first arm where a guide slot slidably coupled with the first guide pin is formed at one end thereof and the optical pick-up is installed at the other end thereof; a second arm of which one end is rotatably coupled with the second guide pin; and a unit for coupling the first and second arms so that they rotate interlockingly. Therefore, an accurate tracking control is possible.

15 Claims, 8 Drawing Sheets

ROTARY ARM-TYPE OPTICAL PICK-UP DRIVING DEVICE

BACKGROUND OF THE INVENTION

The present invention relates to an optical pickup driving device and, more particularly, to a rotary arm type optical pick-up driving device so that accurate tracking control is possible.

In general, an optical pick-up for recording/reproducing information by emitting light to an optical recording medium includes a light source, an optical-path converting means for converting a proceeding path of light emitted from the light source, an object lens, moved by means of a predetermined fine-movement means, for focusing input light, and a photodetector for receiving the light reflected from the optical recording medium and passing through the object lens and the optical-path converting means.

The optical pick-up is positioned below an optical recording medium and moved by a movement means to a selected information track position of the optical recording medium. As the movement means, there is a linear-type in which a pair of guide rails arranged in parallel along a radial direction of the optical recording medium guides the pick-up, and a rotary arm-type in which the optical pick-up is installed at the end of a rotatable arm to thereby move in an arcing direction.

FIG. 1 shows a schematic cross-sectional view of a conventional rotary arm-type optical pick-up driving device. As shown in FIG. 1, a bracket 11 is fixed to a base 10 and a rotary arm 16 is rotatably installed between the bracket 11 and the base 10 by means of a first magnetic circuit unit. The magnetic circuit unit is comprised of a pair of arc-shaped yoke members 13 and 14 symmetrically installed with respect to each other from the plan view thereof, a permanent magnet 17 attached to the yoke member 14, and a coil 15 wound around the yoke member 13, placed within the magnetic field of the magnet 17 and attached to the rotary arm 16. Such configuration of the magnetic circuit unit enables the rotation of the arm 16. During the rotation, the rotary arm 16 is supported by ball bearings 12, 12 installed between the rotary arm 16 and the bracket 11 and between the rotary arm 16 and the base 10.

At one end of the rotary arm 16, an optical pickup 1 is mounted. The optical pick-up 1 includes an object lens 20, a holder 21 where the object lens 20 is mounted, a plurality of leaf springs 27a and 27b for elastically supporting the holder 21, a mount 28 where the leaf springs 27a and 27b are mounted, a fixing block 24 to which the mount 28 is fixed, and a second magnetic circuit unit for fine movements of the object lens 20.

The second magnetic circuit unit comprises a focusing coil 22 wound around the holder 21, a magnet 30 for applying a magnetic field to the focusing coil 22 and a yoke member 23. An optical path 24a is formed in the fixing block 24. In the optical path 24a, an optical module 26 including a light source, a photodetector and a hologram device and a mirror 25 which reflects the light emitted from the light source toward the object lens 20.

In the optical pick-up having such a structure, the light emitted from the optical module 26 and reflected from the mirror 25 is concentrated via the object lens 20 to be incident on an optical recording medium (not shown). The light reflected from the optical recording medium is received at the optical module 26 to detect focusing and tracking error signals. At this time, the correction of the error signals from the optical module 26 is performed in the above first magnetic circuit unit.

In the above optical pick-up, as shown in FIG. 2, the optical pick-up 1 is positioned at desired tracks 2a and 2b by the rotation of the rotary arm 16. In doing so, the angles A and B of the rotary arm 16 with respect to the tracks 2a and 2b of a disk 2 become different. Thus, a problem occurs in that the tracking error signals cannot be accurately controlled since the direction of focusing light via the object lens 20 changes according to each of the tracks 2a and 2b. Particularly, in detecting the tracking error signals using a common 3-beam method, 0-th diffraction light normally follows the main track though the track is displaced, but the ±1st diffraction lights are affected by the adjacent track since deviation from the main track differs with respect to each track.

SUMMARY OF THE INVENTION

To solve the above problems, it is an object of the present invention to provide a rotary arm-type optical pick-up driving device having an improved structure so that accurate tracking control is possible.

Accordingly, to achieve the above object, there is provided an optical pick-up driving device comprising: a base; a rotary arm installed with respect to the base and operative to rotate around a first guide pin; a rotation driving mechanism, arranged along the rotary arm and the base, for rotating the rotary arm; an optical pick-up assembly coupled with the rotary arm and operative to rotate around a second guide pin; and interlocking means, which is interlocked with the rotation of the rotary arm, for rotating the optical pick-up assembly.

To achieve the above object of the present invention, there is provided another optical pick-up driving device comprising: a base; an optical pick-up rotatably supported by the base; rotation driving means for rotating the optical pick-up; and moving means for guiding the movement of the optical pick-up. The moving means comprises a first guide pin installed at one portion of the base and being spaced by a predetermined distance from the optical pick-up; a second guide pin installed on the base to be nearer to the optical pick-up than the first guide pin; a first arm where a guide slot slidably coupled with the first guide pin is formed at one end thereof and the optical pick-up is installed at the other end thereof; a second arm having one end which is rotatably coupled with the second guide pin; and means for coupling the first and second arms to be rotated interlockingly.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
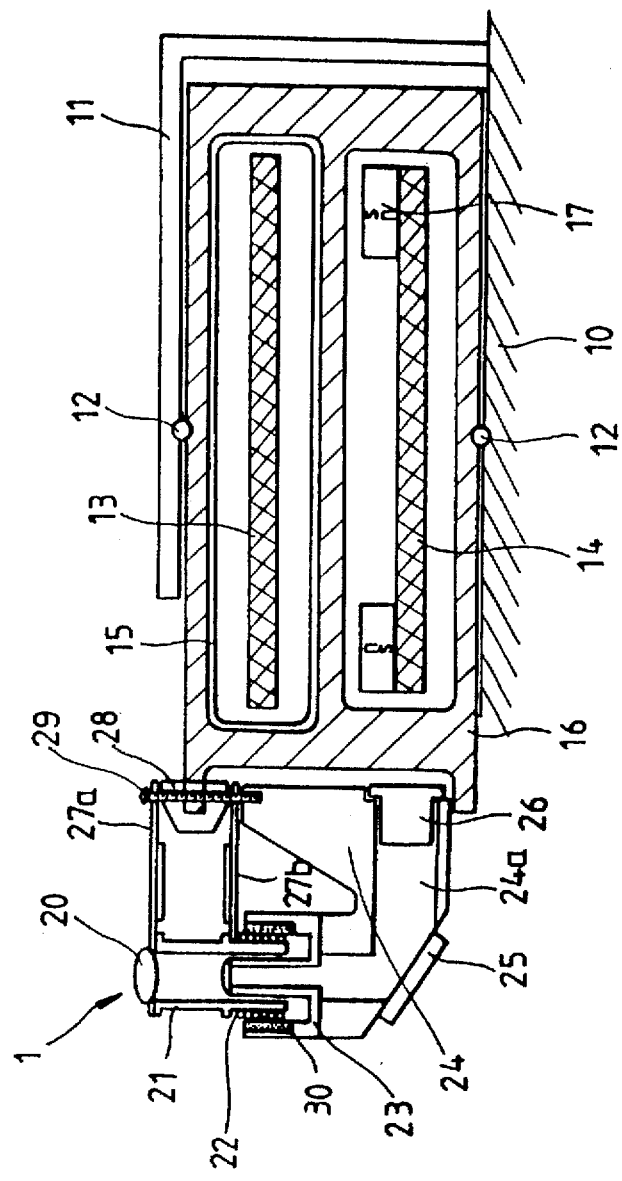
FIG. 1 is a sectional view of a conventional optical pick-up driving device.
Figure 2:
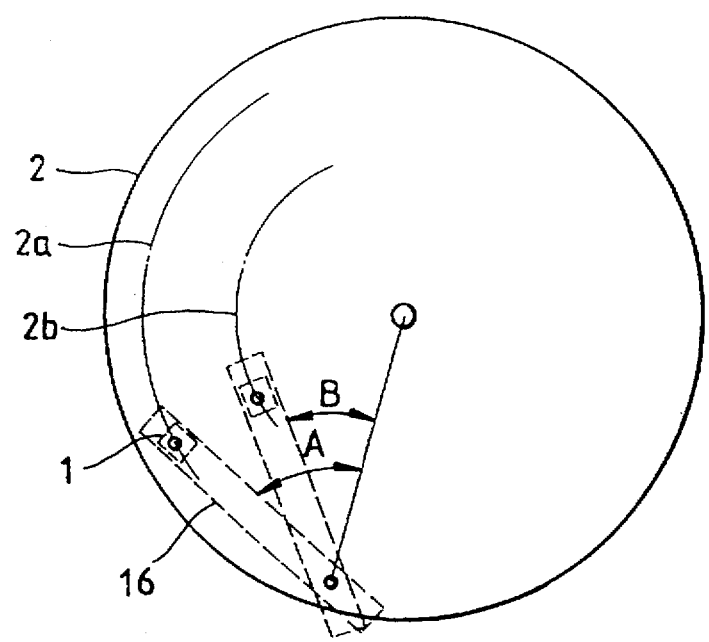
FIG. 2 is a diagram schematically illustrating the motion of a rotary arm moved by the conventional optical pick-up driving device.
Figure 3:
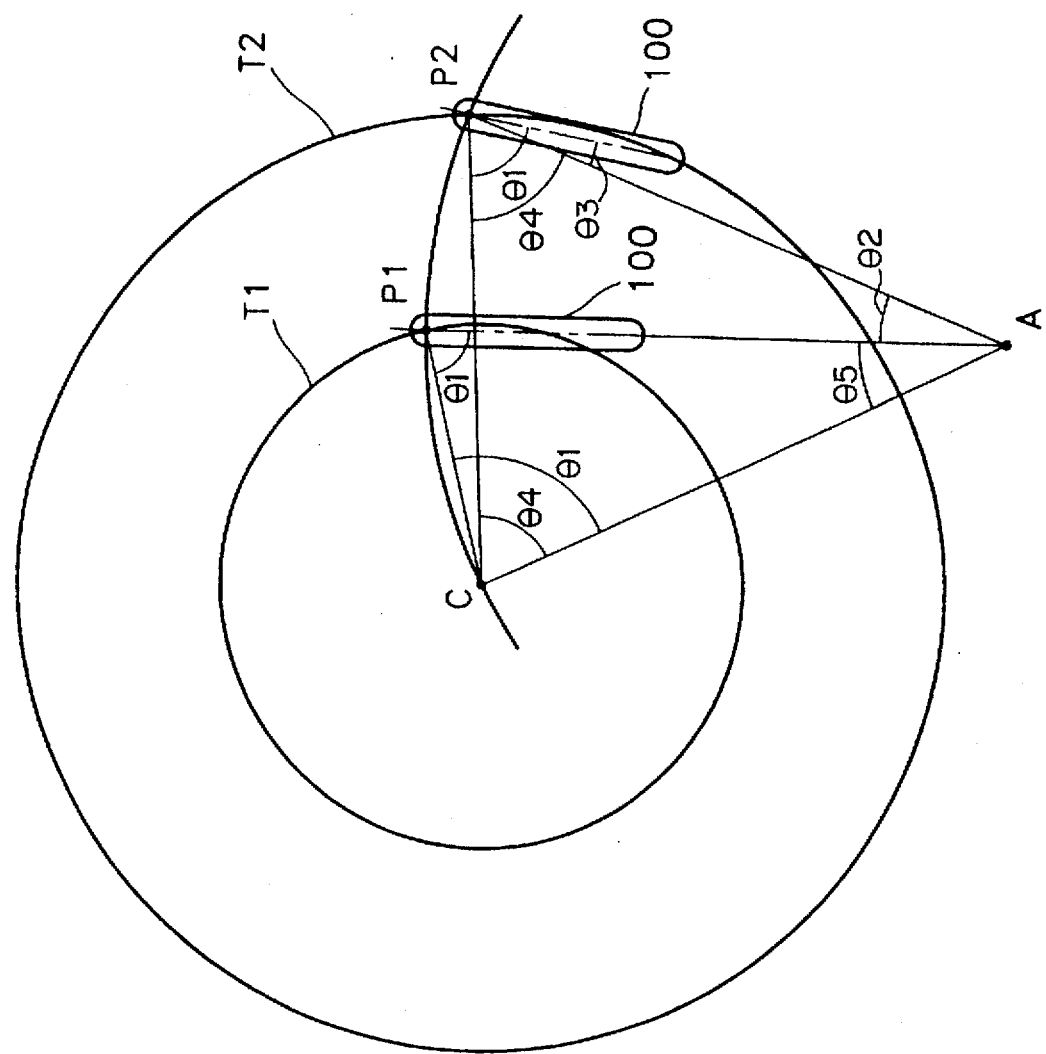
FIG. 3 is a schematic diagram for explaining a driving concept of an optical pick-up driving device according to the present invention.

An optical pick-up driving device according to the present invention employs a driving concept, as shown in FIG. 3, to prevent the displacement of the position of the optical pick-up in accordance with a track.

It is assumed that the rotation center of a recording medium is C and the points of intersection of an arc having a radius corresponding to a distance from an arbitrary point A to the point C and two arbitrary tracks T1 and T2 are P1 and P2, respectively. In this case, the point A indicates the center of a rotary arm and the points P1 and P2 indicate the respective optical focal points.

When a focal point is positioned at P1, an optical pick-up assembly 100 is located on a line connecting the points A and P1. If an angle between the optical pick-up assembly 100 and a definite straight line CP1 is $\theta_1$ though the rotary arm rotates as much as an angle of $\theta_2$ to thus position the focal point at P2, an angle between the optical pick-up assembly 100 and a definite straight line CP2 should maintain the angle 61. Since the length of the rotary arm is the same, the respective triangles CAP1 and CAP2 form an isosceles triangle.

Thus, the following equations are established.

$$2\theta_1+\theta_5=180°$$

(wherein $\theta_5$ is an angle CAP1)

$$2\theta_4+(\theta_5+\theta_2)=180°$$

(wherein $\theta_4$ is an angle ACP2)

$$\theta_3=\theta_1-\theta_4$$

(wherein $\theta_3$ is an angle between the optical pick-up assembly 100 and the rotary arm when the focal point is made at P2).

To sum up the above equations, $2\theta_3=\theta_2$. Namely, when $\theta_3=1/2\theta_2$, the optical pick-up assembly 100 can maintain a constant angle to the respective tracks T1 and T2.

Figure 4:
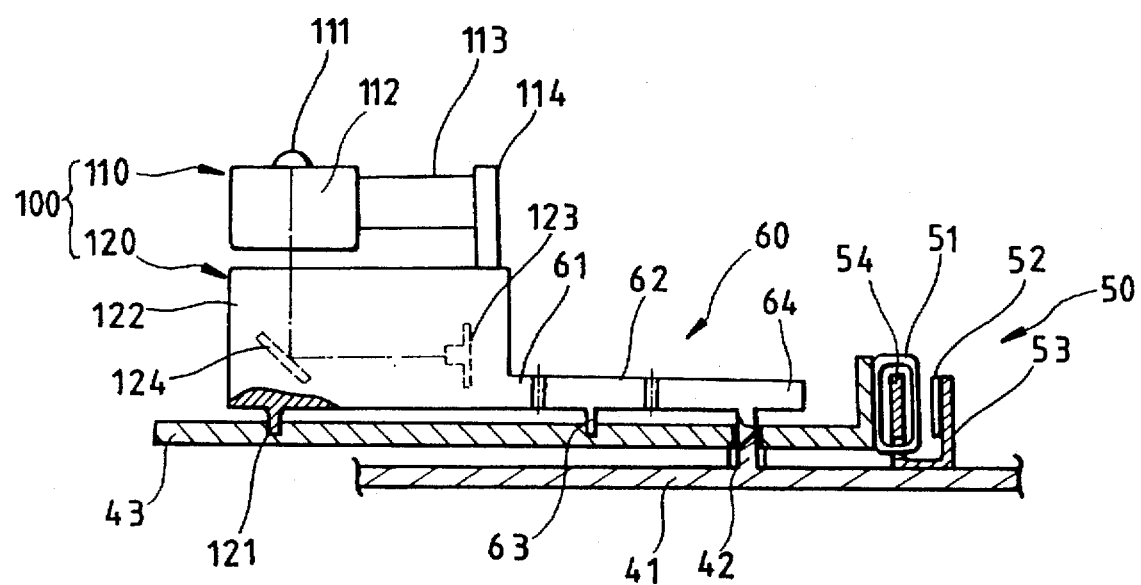
FIG. 4 is a side view schematically showing the optical pick-up driving device according to an embodiment of the present invention.
Figure 5:
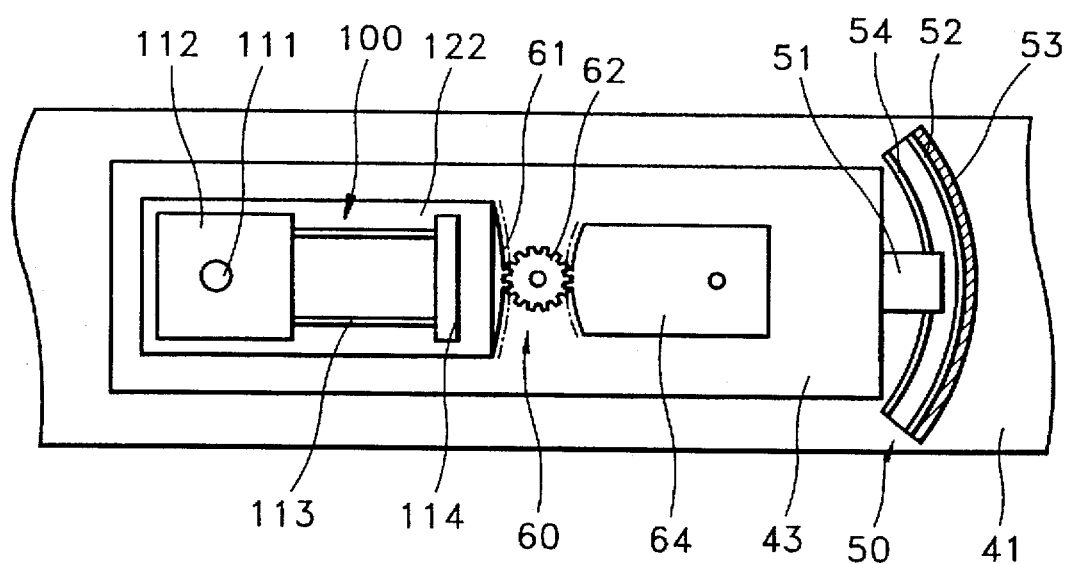
FIG. 5 is a plan view schematically showing the optical pick-up driving device shown in FIG. 4.
Figure 6:
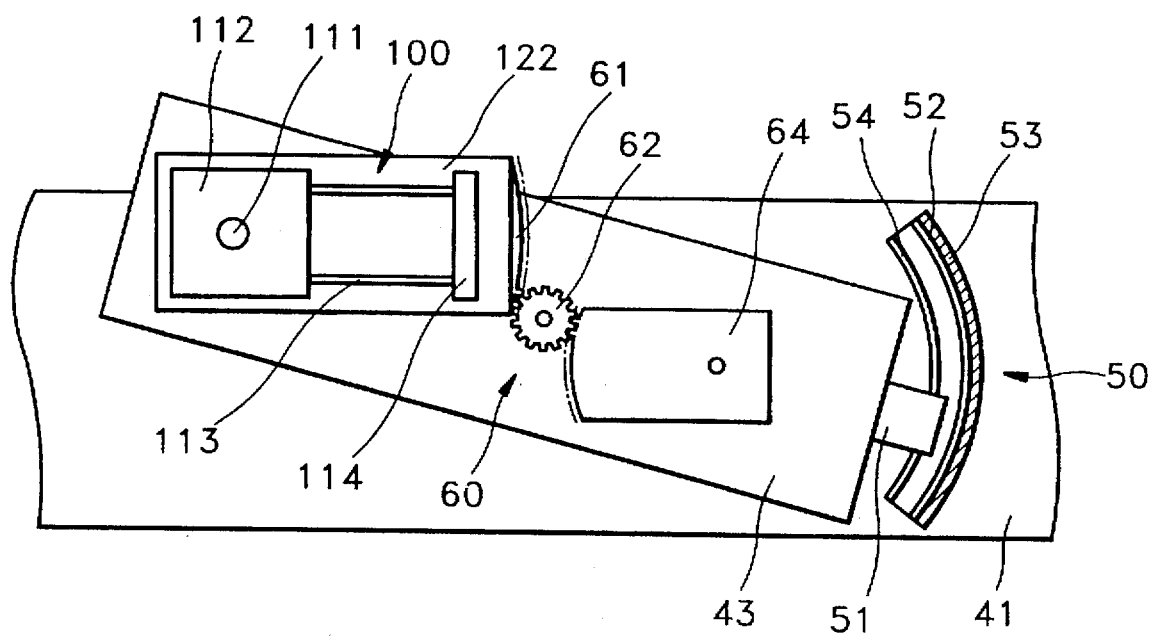
FIG. 6 is a schematic view showing the operation of the optical pick-up driving device according to the embodiment of the present invention.

An optical pick-up driving device according to an embodiment of the present invention adopting the above driving concept, will now be described with reference to FIGS. 4 through 6.

As shown in the drawings, a rotary arm 43 is installed above a base 41 to rotate around a first guide pin 42. The rotary arm 43 is rotated by a rotation driving means 50 which is provided at one end of the rotary arm and the base. The rotation driving means 50 includes a moving coil 51 being attached to one end of the rotary arm 43 and to which a predetermined current is applied, a magnet 52 for generating a magnetic field to the moving coil 51, an outer yoke member 53 for fixing the magnet 52 with respect to the base 41, and an inner yoke member 54 for guiding the moving coil 51. When a predetermined current is applied to the moving coil 51, a magnetic force is generated and the rotary arm 43 accordingly pivots on the first guide pin 42.

The optical pick-up assembly 100 is mounted above the rotary arm 43 to rotate around a second guide pin 121. The optical pick-up assembly 100 includes an actuator 110 and an optical pick-up support portion 120. The actuator 110 includes a holder 112 where an objective lens 111 is mounted, a plurality of elastic support members 113 for elastically supporting the holder 112, and a mount 114 where the elastic support members 113 are mounted. The optical support member 120 is coupled with the second guide pin 121 at the lower portion thereof and includes a pivoting block 122, with the mount 114 being installed at the upper surface thereof. An optical module 123 is installed inside the pivoting block 122. The optical module 123 includes a light source (not shown) such as a semiconductor laser for emitting light, a photodetector (not shown) for receiving the light reflected from a recording medium (not shown), and an optical path converting means (not shown) such as a hologram device. The optical support portion 120 can further include a mirror 124 for guiding the proceeding path of the light from the optical module 122.

The optical pick-up assembly 100 is displaced by an interlocking means 60 which satisfies the conditions of the equation, $\theta_3=1/2\theta_2$, as described with reference to FIG. 3, according to the rotation angle of the rotary arm 43, i.e., at which track of the recording medium the focal point is made to concentrate. The interlocking means 60 includes an arc contact portion 61 (see FIG. 5) formed at one side of the pivoting block 122, a rotary plate 62 rotatably installed on the rotary arm 43 by a rotation shaft 63 and engaged with the contact portion 61, and a fixed plate 64 fixedly installed to the base 41 through the first guide pin 42 and engaged with the rotary plate 62.

It is preferable that gear teeth are formed at each contact surface of the contact portion 61, the rotary plate 62 and the fixed plate 64 to be meshed with one another. Also, the contact surfaces can frictionally contact each other by attaching a rubber member (not shown) having a high frictional factor at each of the outer circumferential surfaces thereof.

The gyration radius of the optical pick-up assembly 100 is formed to be twice that of the fixed plate 64 so that the optical pick-up assembly 100 rotates as much as an angle of $\theta//2$when the rotary arm 43 rotates as much as an angle of $\theta$ to set the focal point at a constant angle with respect to each track on a recording medium.

The optical pick-up driving device according to the embodiment of the present invention having such a structure has the following functional effects.

When current is applied to the moving coil 51, the rotary arm 43 moves from a track on the recording medium to a desired track by an electromagnetic force generated by interaction of the applied current and the magnet 52. At the same time, the optical pick-up assembly 100 pivots on the second guide pin 121 by the interlocking means 60. Since the gyration radius of the optical pick-up assembly 100 is greater than that of the fixed plate 64, the optical pick-up assembly 100 slides from a position as shown in FIG. 5 to a position as shown in FIG. 6. Accordingly, the rotation angle of the optical pick-up assembly 100 becomes less than that of the rotary arm 43. Thus, since the position of the optical pick-up assembly 100 with respect to a tracking direction is only displaced a very small amount when moving to a desired track in the optical pick-up driving apparatus of the present invention, tracking error signals can be accurately controlled.

Figure 7:
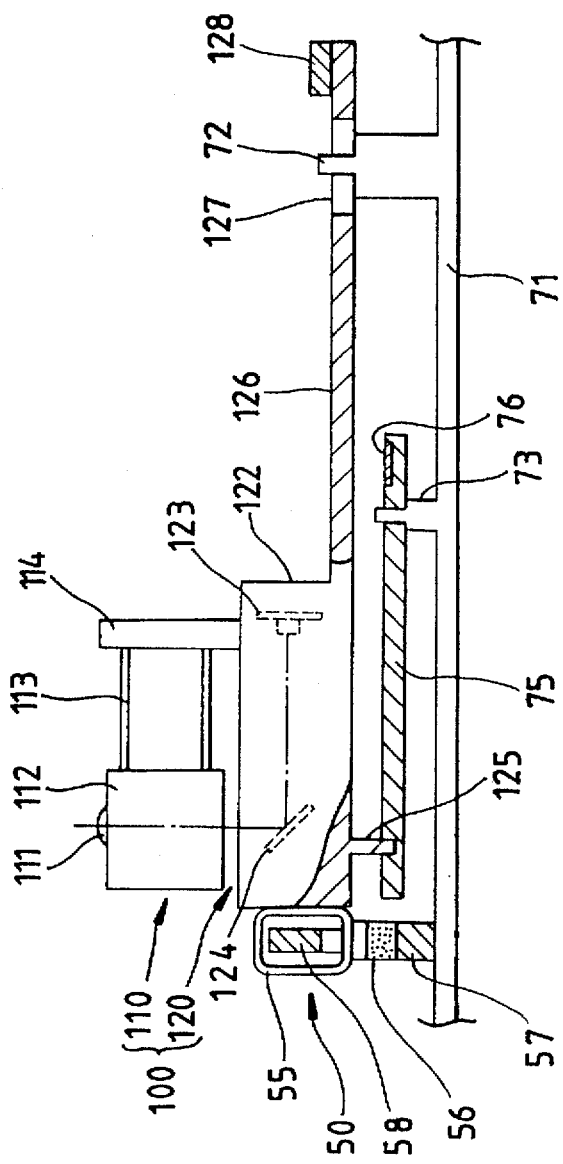
FIG. 7 is a side view schematically showing an optical pick-up driving device according to another embodiment of the present invention.
Figure 8:
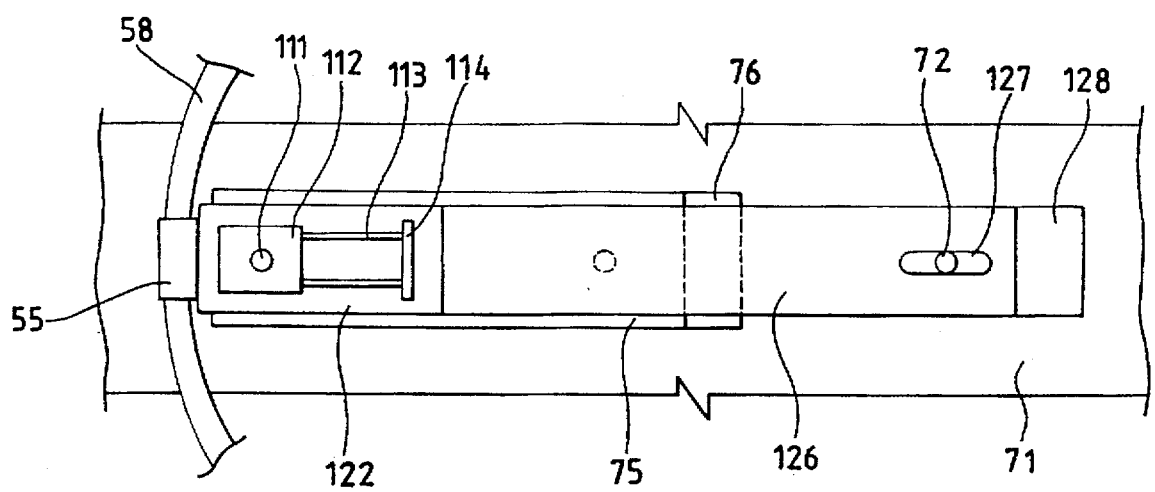
FIG. 8 is a plan view of the optical pick-up driving device shown in FIG. 7.
Figure 9:
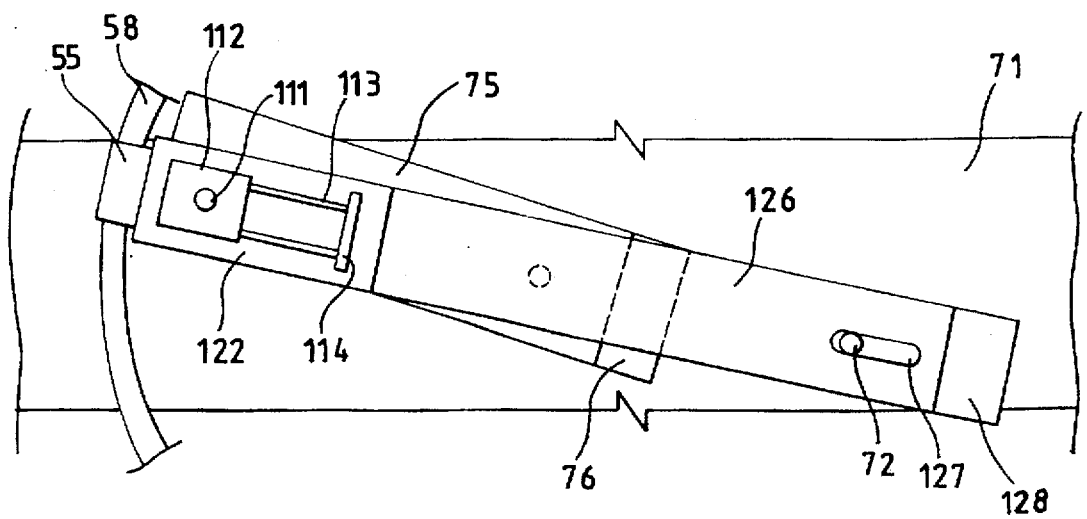
FIG. 9 is a schematic view showing the operation of the optical pick-up driving device shown in FIG. 7.

An optical pick-up driving device according to another embodiment of the present invention will now be described referring to FIGS. 7 through 9.

As shown in the drawings, an optical pick-up assembly 100 is rotatably installed on a base 71 around a first guide pin 72. The optical pick-up assembly 100 has an actuator 110 and an optical supporting unit 120. The actuator 110 comprises a holder 112 where an object lens 111 is mounted, a plurality of elastic support members 113 for elastically supporting the holder 112 and a mount 114 to which the elastic support members 113 are installed.

The optical supporting unit 120 includes a first arm 126 which is rotatably coupled with the first guide pin 72 at one side and supports the actuator 110 at the other side, and a pivoting block 122 installed at one end of the first arm 126 and having the mount 114 on the upper surface thereof. The pivoting block 122 comprises an optical module 123 for generating light and receiving the light reflected from a recording medium. Here, the optical module 123 includes a light source (not shown) for generating and emitting light such as a semiconductor laser beam, a photodetector (not shown) for receiving the light reflected from an optical recording medium (not shown), and an optical-path converting means (not shown) such as a hologram device. Also, the optical supporting unit 120 can further include inside the pivoting block 122 a mirror 124 for diverting the path of light, considering the optical arrangement of the optical elements.

The optical pick-up assembly 100 is rotated by a rotation driving means 50 and moved linearly by a movement unit, both of which will be described later.

The rotation driving means 50 is comprised of a moving coil 55, positioned adjacent to one side of the optical supporting unit 120, to which a predetermined current is applied, a magnet 56 for producing a magnetic field to the moving coil 55, an outer yoke member 57 for fixing the magnet 56 to the base 71, and an inner yoke member 58 for guiding the moving coil 55. When a predetermined current is applied to the moving coil 55, a magnetic force is generated and thus the optical pick-up assembly 100 rotates around the first guide pin 72.

The movement unit has the following structure. At the base 71, a second guide pin 73 having a height lower than the first guide pin 72 is formed to be spaced from the first guide pin 72. A second arm 75 is rotatably coupled with the second guide pin 73. The second arm 75 is installed under the optical supporting unit 120 and the radius of gyration thereof is one-half that of the optical pick-up assembly 100, so that $\theta_3 = 1/2\theta_2$ as described with reference to FIG. 3. A guide slot 127 slidably coupled with the guide pin 72 is formed at the first arm 126 of the optical supporting unit 120. The second arm 75 is coupled to the optical supporting unit 120 by a predetermined coupling means to thereby rotate along with the optical pick-up assembly 100 which is rotated by the rotation driving means 50. It is preferable that the coupling means is comprised of a coupling pin 125 protruding from the bottom of the optical supporting unit 120 and rotatably coupled with the second arm 75.

Also, balance weights 128 and 76 for maintaining balance are preferably installed at the ends of the first arm 126 and the second arm 75, respectively.

The operation and effects of the optical pick-up driving device having such a structure according to the present invention will now be described.

When current is applied to the moving coil 55, an electromagnetic force is generated by the rotation driving means 50. The optical pick-up assembly 100 is moved along an arc from one track to another on the recording medium by the above electromagnetic force. Concurrently, the second arm 75 rotates around the second guide pin 73. At this time, since the radius of gyration of the optical pick-up assembly 100 is greater than that of the second arm 75, the optical pick-up assembly 100 slides from a position as shown in FIG. 8 to a position as shown in FIG. 9, which is possible due to the guide slot 127 formed in the first arm 126. Thus, the rotation angle of the optical pick-up assembly 100 is less than that of the second arm 75.

As described above, in the optical pick-up driving device according to the present invention, hardly any displacement occurs when the optical pickup assembly is moved to a desired track so that tracking error signals can be controlled more accurately.

It is noted that the present invention is not limited to the preferred embodiment described above, and it is apparent that variations and modifications by those skilled in the art can be effected within the spirit and scope of the present invention as defined in the appended claims.

What is claimed is:

1. An optical pick-up driving device comprising:

a base;

a first guide pin formed on said base;

a rotary arm installed with respect to said base to rotate around said first guide pin;

rotation driving means, arranged along said rotary arm and said base, for rotating said rotary arm;

an optical pick-up assembly rotatably coupled through a second guide pin with said rotary arm to rotate around said second guide pin; and interlocking means, which is interlocked with the rotation of said rotary arm, for rotating said optical pick-up assembly, wherein said interlocking means comprises:

an arc contact portion formed at one side of said optical pick-up assembly;

a rotary plate rotatably installed on said rotary arm and engaged with said arc contact portion; and a fixed plate fixedly installed on said base by being combined with said first guide pin and engaged with said rotary plate.

2. The optical pick-up driving device as claimed in claim 1, wherein said rotation driving means comprises:

a moving coil being located at one end of said rotary arm and to which current is applied;

a magnet for generating a magnetic field with respect to said moving coil; and a yoke member fixed to said base for supporting said magnet and guiding said moving coil.

3. The optical pick-up driving device as claimed in claim 1, wherein gear teeth are formed at each outer circumferential surface of said arc contact portion, said rotary plate, and said fixed plate to be meshed with one another.

4. The optical pick-up driving device as claimed in claim 1, wherein a rubber member is formed at each outer circumferential surface of said arc contact portion, said rotary plate, and said fixed plate to friction-contact each other.

5. The optical pick-up driving device as claimed in claim 1, wherein the radius of said arc contact portion is twice that of said fixed plate.

6. An optical pick-up driving device comprising:

a base;

an optical pick-up assembly rotatably supported by said base;

rotation driving means for rotating said optical pick-up assembly; and moving means for guiding movement of said optical pick-up assembly, said moving means comprising:

a first guide pin installed at one portion of said base and being spaced by a predetermined distance from said optical pick-up assembly;

a second guide pin installed on said base to be nearer to said optical pick-up assembly than said first guide pin;

a first arm having a guide slot, which is slidably coupled with said first guide pin, formed at one end thereof and having said optical pick-up assembly installed at another end thereof;

a second arm having one end which is rotatably coupled with said second guide pin; and means for coupling said first arm and said second arm such that said first arm and said second arm rotate interlockingly.

7. The optical pick-up driving device as claimed in claim 6, wherein said rotation driving means comprises:

a moving coil which is positioned next to said optical pick-up and current is applied thereto;

a magnet for forming a magnetic field with respect to said moving coil; and a yoke member fixedly installed on said base for supporting said magnet and guiding said moving coil.

8. The optical pick-up driving device as claimed in claim 6, wherein said coupling means includes a coupling pin protruding from a bottom of said optical pick-up assembly and which is coupled with said second arm.

9. The optical pick-up driving device as claimed in claim 6, wherein said second arm has a gyration radius which is twice that of said optical pick-up assembly.

10. The optical pick-up driving device as claimed in claim 6, further comprising a balance weight on an end portion of said first arm which is opposite to said optical pick-up assembly.

11. The optical pick-up driving device as claimed in claim 6, further comprising a balance weight on an end portion of said second arm which is opposite to said coupling means.

12. An optical pick-up driving device comprising:

a base;

a first guide pin formed on said base;

a rotary arm installed with respect to said base to rotate around said first guide pin;

rotation driving motor arranged along said rotary arm and said base and which rotates said rotary arm;

an optical pick-up assembly rotatably coupled through a second guide pin with said rotary arm to rotate around said second guide pin; and an interlocking mechanism which is interlocked with the rotation of said rotary arm, said interlocking mechanism including:

a contact portion formed at one side of said optical pick-up assembly;

a rotary member rotatably installed on said rotary arm and engaged with said contact portion; and a fixed member fixedly installed on said base by being combined with said first guide pin and engaged with said rotary member, thereby to rotate said optical pick-up assembly.

13. The optical pick-up driving device as claimed in claim 12, wherein said contact portion comprises an arc contact portion, and wherein gear teeth are formed at each outer circumferential surface of said arc contact portion, said rotary member, and said fixed member to be meshed with one another.

14. The optical pick-up driving device as claimed in claim 12, wherein said contact portion comprises an arc contact portion, and wherein a rubber member is formed at each outer circumferential surface of said arc contact portion, said rotary member, and said fixed member to friction-contact each other.

15. The optical pick-up driving device as claimed in claim 12, wherein said contact portion comprises an arc contact portion, and wherein the radius of said arc contact portion is twice that of said fixed member.

* * * * *